(12) United States Patent
Aznag et al.

(10) Patent No.: US 9,647,437 B2
(45) Date of Patent: May 9, 2017

(54) RE-ENTERABLE ENCLOSURE AND CONFIGURATION FOR MOUNTING

(71) Applicant: TYCO ELECTRONICS RAYCHEM BVBA, Kessel-Lo (BE)

(72) Inventors: Mohamed Aznag, Scherpenheuvel (BE); Philippe Coenegracht, Hasselt (BE); Diederik Houben, Berbroek (BE); Pieter Doultremont, Kermt-Hasselt (BE); Eddy Maes, Maasmechelen (BE); Geert Van Genechten, Vorselaar (BE); Maddy Nadine Frederickx, Aarschot (BE); Maarten Michiels, Herent (BE); Emilie F. De Groe, Kessel-Lo (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 81 days.

(21) Appl. No.: 14/768,054

(22) PCT Filed: Feb. 19, 2014

(86) PCT No.: PCT/EP2014/053175
§ 371 (c)(1),
(2) Date: Aug. 14, 2015

(87) PCT Pub. No.: WO2014/128138
PCT Pub. Date: Aug. 28, 2014

(65) Prior Publication Data
US 2015/0380919 A1 Dec. 31, 2015

Related U.S. Application Data

(60) Provisional application No. 61/766,539, filed on Feb. 19, 2013.

(51) Int. Cl.
*G02B 6/44* (2006.01)
*H02G 15/013* (2006.01)
(Continued)

(52) U.S. Cl.
CPC ......... *H02G 15/013* (2013.01); *G02B 6/4444* (2013.01); *H01R 31/02* (2013.01);
(Continued)

(58) Field of Classification Search
CPC ..... G02B 6/4444; H05K 5/0204; H05K 5/061
See application file for complete search history.

(56) References Cited

U.S. PATENT DOCUMENTS 5,097,529 A * 3/1992 Cobb ................... G02B 6/4442
385/135
5,185,845 A * 2/1993 Jones ................... G02B 6/4454
385/135

(Continued)

FOREIGN PATENT DOCUMENTS

CN 201 637 902 11/2010
EP 0 442 941 1/1995
(Continued)

OTHER PUBLICATIONS

International Search Report for International Application No. PCT/EP2014/053175 mailed Sep. 10, 2014 (5 pages).

*Primary Examiner* — Hung V Ngo
(74) *Attorney, Agent, or Firm* — Merchant & Gould P.C.

(57) ABSTRACT

A telecommunications enclosure (20) including a housing (22) with a dome (24) that connects to a base (26). The enclosure (20) includes an insert assembly (28) that fits within the housing (22) and the insert assembly (28) includes a sealing unit (30) that fits within the base (26) and defines a plurality of cable ports (32). The insert assembly (28) also includes a frame (34) attached to the sealing unit (Continued)

(30) and a telecommunications component (36) mounted to the frame (34). The enclosure (20) further includes a mounting bracket (38) for mounting the housing (22) at a desired mounting location. The mounting bracket (38) has a first securement interface (114) for attaching the mounting bracket (38) to the base (26) of the housing (22) and a second securement interface (122) for attaching the mounting bracket (38) to the insert assembly (28).

17 Claims, 7 Drawing Sheets

(51) Int. Cl.
*H02G 15/076* (2006.01)
*H01R 31/02* (2006.01)
*H01R 31/06* (2006.01)
*H02G 3/00* (2006.01)
*H02G 3/22* (2006.01)
*H02G 15/007* (2006.01)

(52) U.S. Cl.
CPC ............ *H01R 31/06* (2013.01); *H02G 3/26* (2013.01); *H02G 15/076* (2013.01); *H02G 3/22* (2013.01); *H02G 15/007* (2013.01)

(56) References Cited

U.S. PATENT DOCUMENTS

| | | | |
|---|---|---|---|
| 5,255,337 A * | 10/1993 | Theys | G02B 6/3801 385/135 |
| 5,596,670 A | 1/1997 | Debortoli et al. | |
| 5,617,501 A * | 4/1997 | Miller | G02B 6/4471 385/134 |
| 5,774,618 A | 6/1998 | Jones | |
| 6,046,406 A | 4/2000 | Milanowski et al. | |
| 6,940,014 B1 * | 9/2005 | Smith | H05K 5/0204 174/562 |
| 7,099,158 B1 * | 8/2006 | Bjorklund | H04Q 1/02 248/346.03 |
| 2004/0189157 A1 * | 9/2004 | Adams | H04Q 1/025 312/223.6 |
| 2006/0005985 A1 * | 1/2006 | L'Henaff | H05K 5/0204 174/50 |
| 2008/0224419 A1 | 9/2008 | Mullaney et al. | |
| 2009/0231828 A1 * | 9/2009 | Madore | H05K 5/0204 361/825 |
| 2010/0150517 A1 * | 6/2010 | Allen | G02B 6/4444 385/135 |
| 2012/0235363 A1 * | 9/2012 | Vanhentwnrijk | G02B 6/4444 277/627 |
| 2013/0236151 A1 * | 9/2013 | Kim | G02B 6/4444 385/135 |
| 2013/0294739 A1 * | 11/2013 | Allen | G02B 6/4444 385/135 |

FOREIGN PATENT DOCUMENTS

| | | |
|---|---|---|
| EP | 0 587 616 | 7/1996 |
| EP | 2 330 707 | 6/2011 |
| WO | WO 92/22113 | 12/1992 |
| WO | WO 2014/005917 | 1/2014 |

* cited by examiner

RE-ENTERABLE ENCLOSURE AND CONFIGURATION FOR MOUNTING

CROSS REFERENCE TO RELATED APPLICATIONS

This application is a National Stage of PCT/EP2014/053175, filed 19 Feb. 2014, which claims the benefit of U.S. Provisional Application Ser. No. 61/766,539 entitled "RE-ENTERABLE ENCLOSURE AND CONFIGURATION FOR MOUNTING," filed Feb. 19, 2013, and which applications are hereby incorporated by reference in their entireties. To the extent appropriate, a claim of priority is made to each of the above disclosed applications.

TECHNICAL FIELD

The present disclosure relates generally to telecommunications equipment. More particularly, the present disclosure relates to sealed enclosures used in telecommunication systems.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B 1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

One aspect of the present disclosure relates to a telecommunications enclosure including a housing having a dome that connects to a base. The telecommunications enclosure also includes an insert assembly that is at least partially housed within the housing. The insert assembly includes a sealing unit that fits within the base of the housing and that define a plurality of cable ports. The insert assembly also includes a frame attached to the sealing unit and a telecommunications component mounted to the frame. The frame is housed within the dome when the sealing unit is fitted within the base. The telecommunications enclosure further includes a mounting bracket for mounting the housing at a desired mounting location. The mounting bracket has a first securement interface for attaching the mounting bracket to the base of the housing. When the mounting bracket is attached to the base of the housing by the first securement interface, the insert assembly can be removed from the housing without detaching the base from the mounting bracket. The mounting bracket also has a second securement interface for attaching the mounting bracket to the insert assembly. When the mounting bracket is attached to the insert assembly by the second securement interface, the base and the dome can be removed from the insert assembly without detaching the insert assembly from the mounting bracket.

Another aspect of the present disclosure relates to a telecommunications enclosure having a housing that includes a dome that connects to a base. The telecommunications enclosure also includes a mounting bracket for mounting the housing at a desired mounting location. The mounting bracket includes a main support structure on which the base of the housing seats. The main support structure includes a first end and a second end. The mounting bracket also includes a first mounting plate pivotally connected to the first end of the main support structure by a first pivot pin defining a first pivot axis and second mounting plate pivotally connected to the second end of the main support structure by a second pivot pin defining a second pivot axis. By removing the first pivot pin, the main support structure of the mounting bracket can pivot relative to the second mounting plate about the second pivot axis to provide access to the back side of the enclosure. By removing the second pivot pin, the main support structure can pivot relative to the first mounting plate about the first pivot axis to provide access to the rear of the telecommunications enclosure. The ability to pivot from either side of the mounting bracket provides more flexibility in the field for accessing the back side of the enclosure. In the field, factors such as cable placement, cable routing and the positioning of the enclosure adjacent to obstructions can limit the ability to pivot the mounting bracket from one side or the other. The dual pivoting configuration of the mounting bracket assists in addressing this issue.

Still another aspect of the present disclosure relates to a telecommunications enclosure including a housing having a dome that connects to a base. The telecommunications enclosure also includes a sealing unit that fits within the base and that defines a plurality of cable ports. The sealing unit includes a sealant material that defines the cable ports. The sealing unit also includes an actuation arrangement for pressurizing the sealant material. The actuation arrangement includes inner and outer pressurization structures between which this sealant material is positioned. The actuation arrangement also includes an actuator for forcing the inner and outer pressurization structures together to pressurize the sealant material thereby forming seals around cables routed through the cable ports defined by the sealant material. When the sealing unit is fitted within the base of the housing, an inner side of the sealant material faces toward the dome and an outer side of the sealant material faces away from the dome. The inner pressurization structure of the actuation arrangement opposes the inner side of the sealant material and the outer pressurization structure opposes the outer side of the sealant material. The telecommunications enclosure further includes a retainer for fixing the inner pressurization structure relative to the base. The retainer is moveable between a retaining position where the retainer engages the inner pressurization structure and a non-retaining position where the retainer disengages from the inner pressurization structure. When the retainer is in the non-retaining position, inner pressurization structure can be moved relative to the base. Also, when the retainer is in the non-retaining position, the retainer interferes with the ability of the dome to be fitted on the base. In this way, the dome cannot be mounted on the base unless the retainer has been moved to the retaining position to fix the inner pressurization structure relative to the base. In one example, the retainer is a U-shaped retainer that is slideably mounted relative to the base and that is not removable from the base.

A further aspect of the present disclosure relates to a telecommunications enclosure including a housing having a dome that connects to a base. The telecommunications enclosure also includes a sealing unit that fits within the base and that defines a plurality of cable ports. The sealing unit includes a sealant material that defines the cable ports and an actuation arrangement for pressurizing the sealant material to form seals around cables routed through the cable ports. The actuation arrangement includes inner and outer pressurization structures between which the sealant material is positioned. The actuation arrangement also includes an actuator for forcing the inner and outer pressurization structures together to pressurize the sealant material to form seals around cables routed through the cable ports. When the sealing unit is fitted within the base of the housing, an inner side of the sealant material faces toward the dome and an outer side of the sealant material faces away from the dome. The inner pressurization structure of the actuation arrangement opposes the inner side of the sealant material and the outer pressurization structure of the actuation arrangement opposes the outer side of the sealant material. The telecommunications enclosure further includes an exterior cable anchoring structure that is positioned outwardly from the outer pressurization structure and that is fixed relative to the inner pressurization structure. In one example, the inner pressurization structure includes a mounting feature that extends through the outer pressurization structure and provides a connection location for attaching the exterior cable anchoring structure to the inner pressurization structure. In one example, exterior cable anchoring structure defines a plurality of cable tie-down locations for securing the cable jackets of cables routed into the housing to the exterior cable anchoring structure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventions and inventive concepts upon which the embodiments disclosed herein are based.

DETAILED DESCRIPTION

Figure 1:
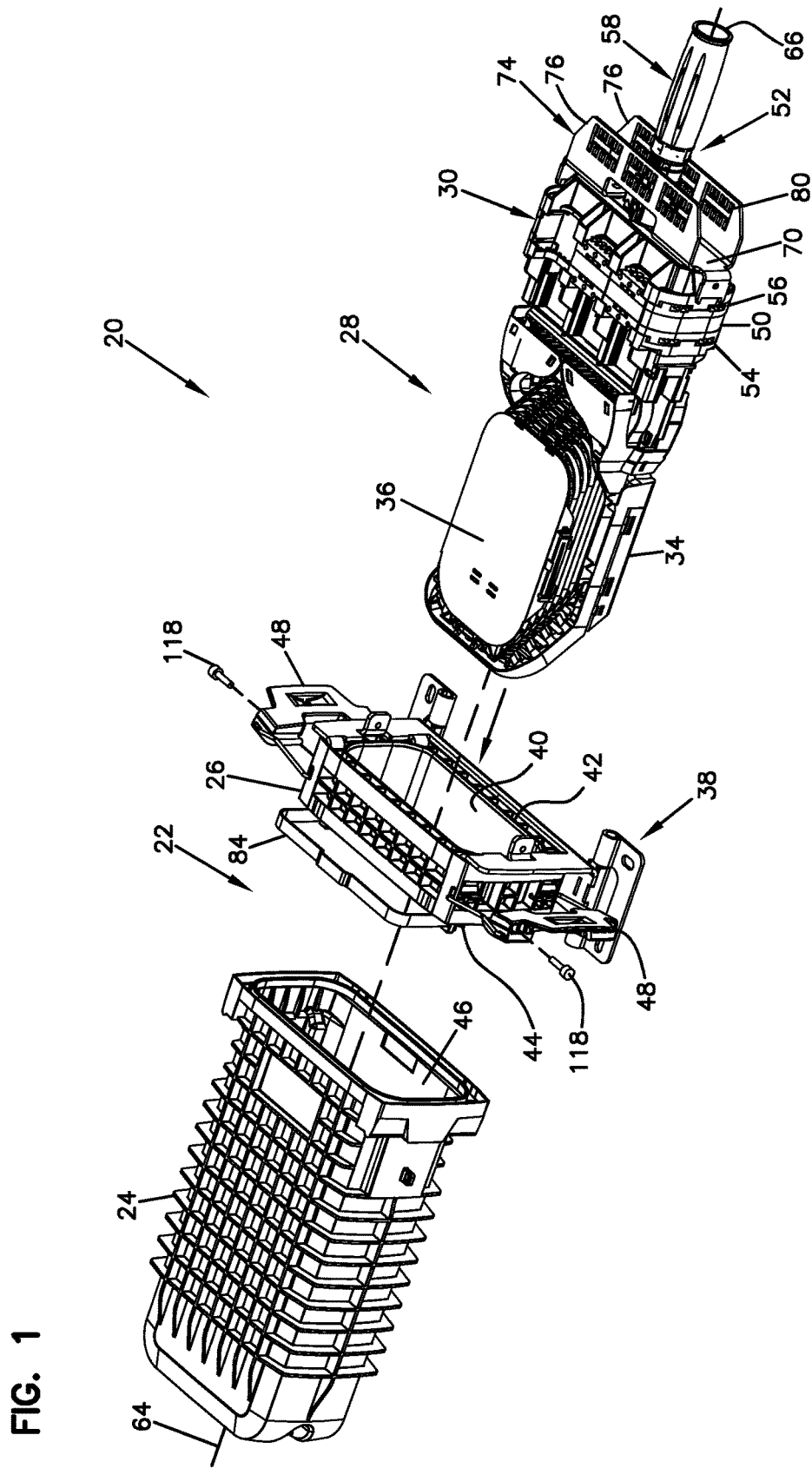
FIG. 1 is an exploded view of a telecommunications enclosure in accordance with the principles of the present disclosure.
Figure 2:
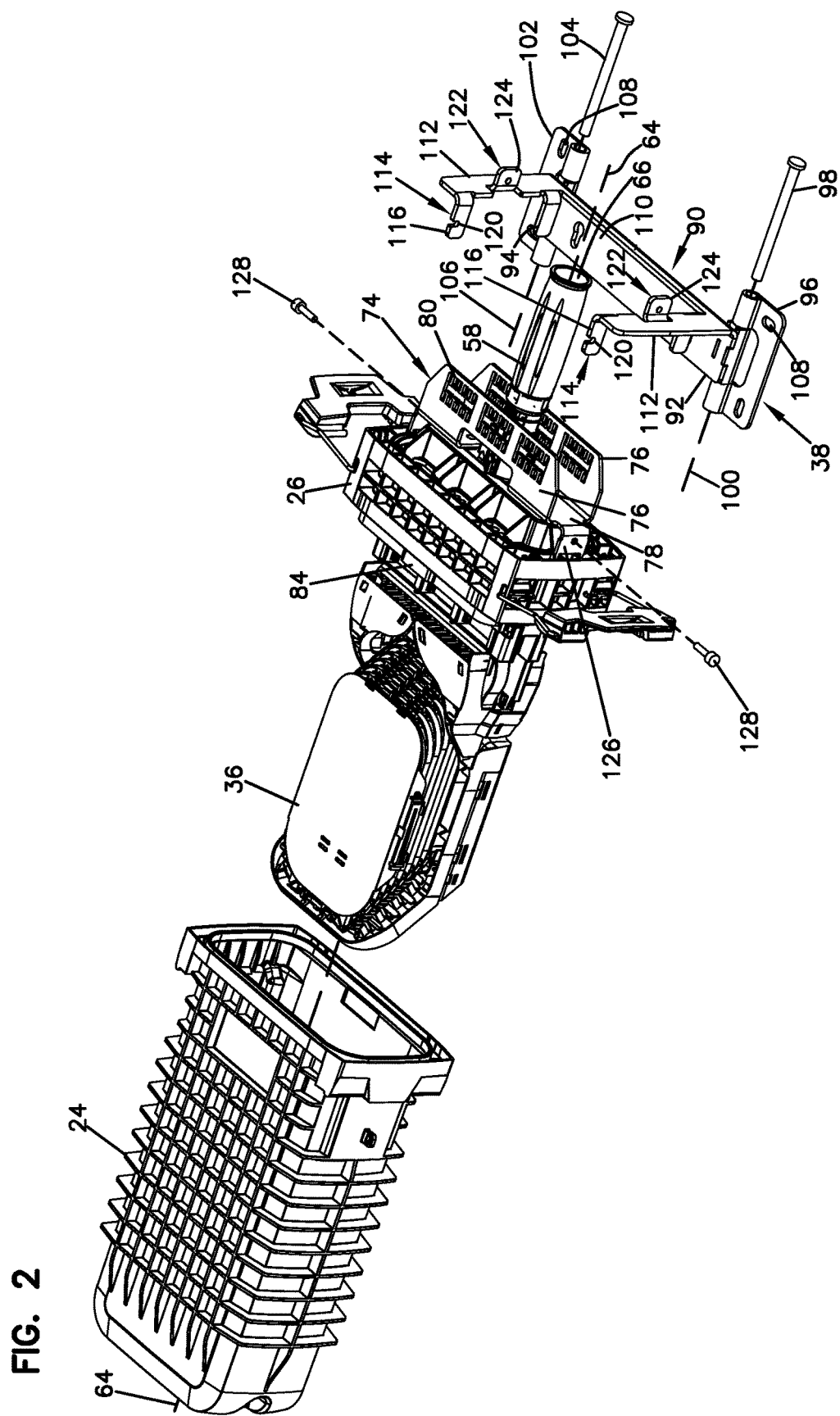
FIG. 2 is another exploded view of the telecommunications enclosure of FIG. 1.

FIGS. 1 and 2 illustrate a telecommunications enclosure 20 in accordance with the principles of the present disclosure. The telecommunications enclosure 20 includes a housing 22 having a dome 24 that connects to a base 26. The telecommunications enclosure also includes an insert assembly 28 that fits within the housing. The insert assembly 28 includes a sealing unit 30 that fits within the base 26 and that defines a plurality of cable ports 32 (see FIG. 5). The insert assembly 28 also includes a frame 34 attached to the sealing unit 30 and one or more telecommunications components 36 (e.g., optical splicing trays, optical splices, optical power splitters, optical power splitting trays, wavelength division multiplexers, fiber managers, slack fiber storage devices and/or other structures) mounted on the frame 34. The frame 34 is housed within the dome 24 when the sealing unit 30 is fitted within the base 26. The telecommunications enclosure 20 further includes a mounting bracket 38 for mounting the housing 22 at a desired mounting location (e.g., on a wall, on a pole, on a handle, or at any other location).

The base 26 of the housing 22 defines a main opening 40 that extends through the base 26 from an outer end 42 of the base 26 to an inner end 44 of the base. The inner end 44 of the base 26 connects with an open end 46 of the dome 24 at sealed interface. Latches 48 are used to latch the dome 24 to the base 26.

Figure 5:
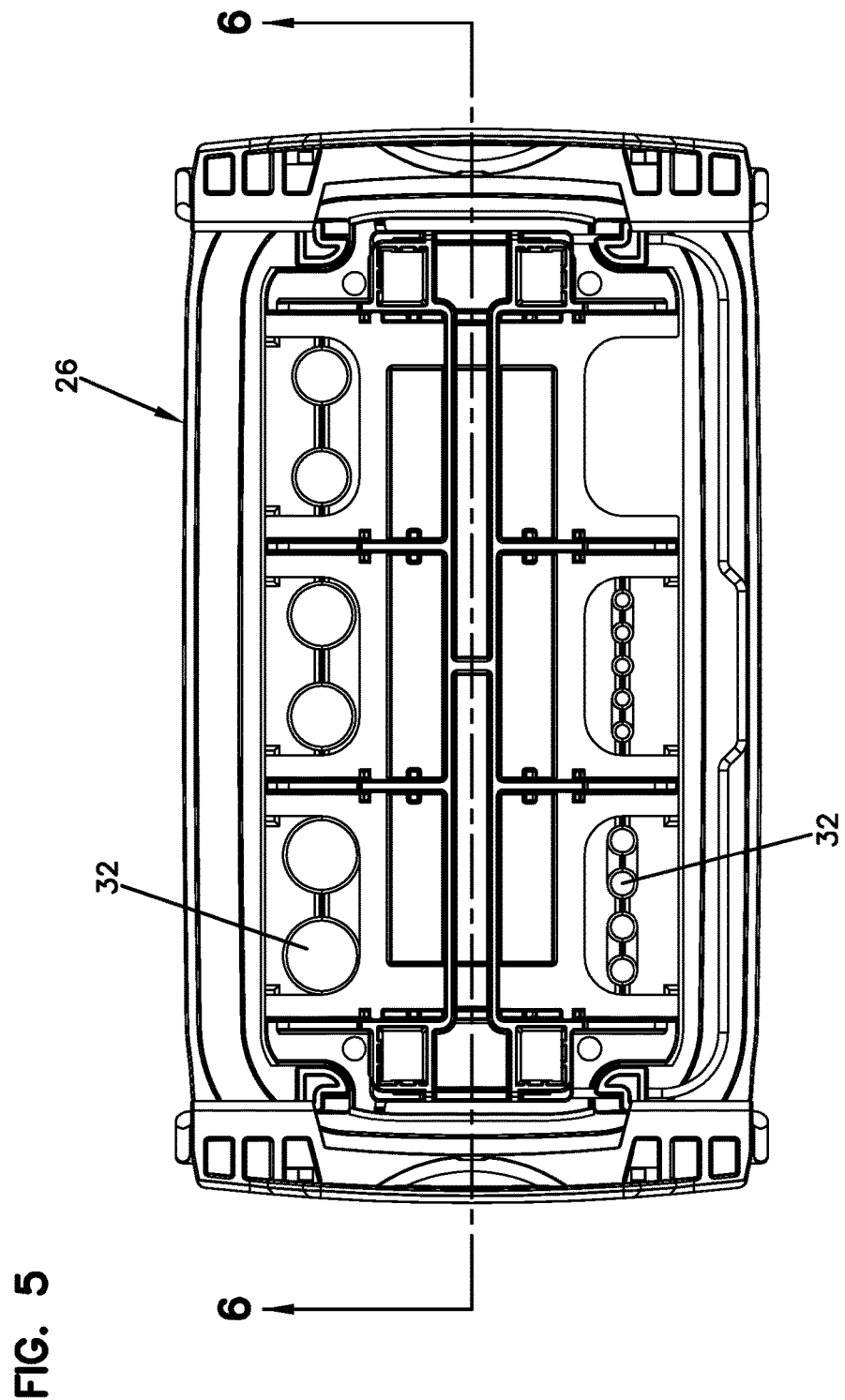
FIG. 5 is a view of the inner side of the components of FIG. 4.

The sealing unit 30 of the telecommunications enclosure 20 includes a sealant material 50 (e.g., gel, rubber, silicone rubber, or like materials) that defines the cable ports 32 (see FIG. 5). The sealing unit 30 also includes an actuation arrangement 52 for pressurizing the sealant material 50 thereby causing the sealant material 50 to form seals around cables routed through the cable ports 32. The actuation arrangement 52 includes inner and outer pressurization structures 54, 56 between which the sealant material 50 is positioned. The actuation arrangement 52 also includes an actuator 58 for forcing the inner and outer pressurization structures 54, 56 together to pressurize the sealant material 50. When the sealing unit 30 is fitted within the base 26, an inner side 60 (see FIG. 6) of the sealant material 50 faces toward the dome 24 and an outer side 62 of the sealant material 50 faces away from the dome 24. The inner pressurization structure 54 opposes the inner side 60 of the sealant material 50 and the outer pressurization structure 56 opposes the outer side 62 of the sealant material 50. The cable ports 32 extend through the sealant material 50 and the inner and outer pressurization structures 54, 56 along an axis 64 of the housing 22 such that cables can be directed through the base 26 and into the dome 24 by routing the cables through the cable ports 32 and the inner and outer pressurization structures 54, 56. When the sealant material 50 is pressurized by the actuation arrangement 52, the sealant material 50 also forms a peripheral seal around the interior of the base 26.

Figure 6:
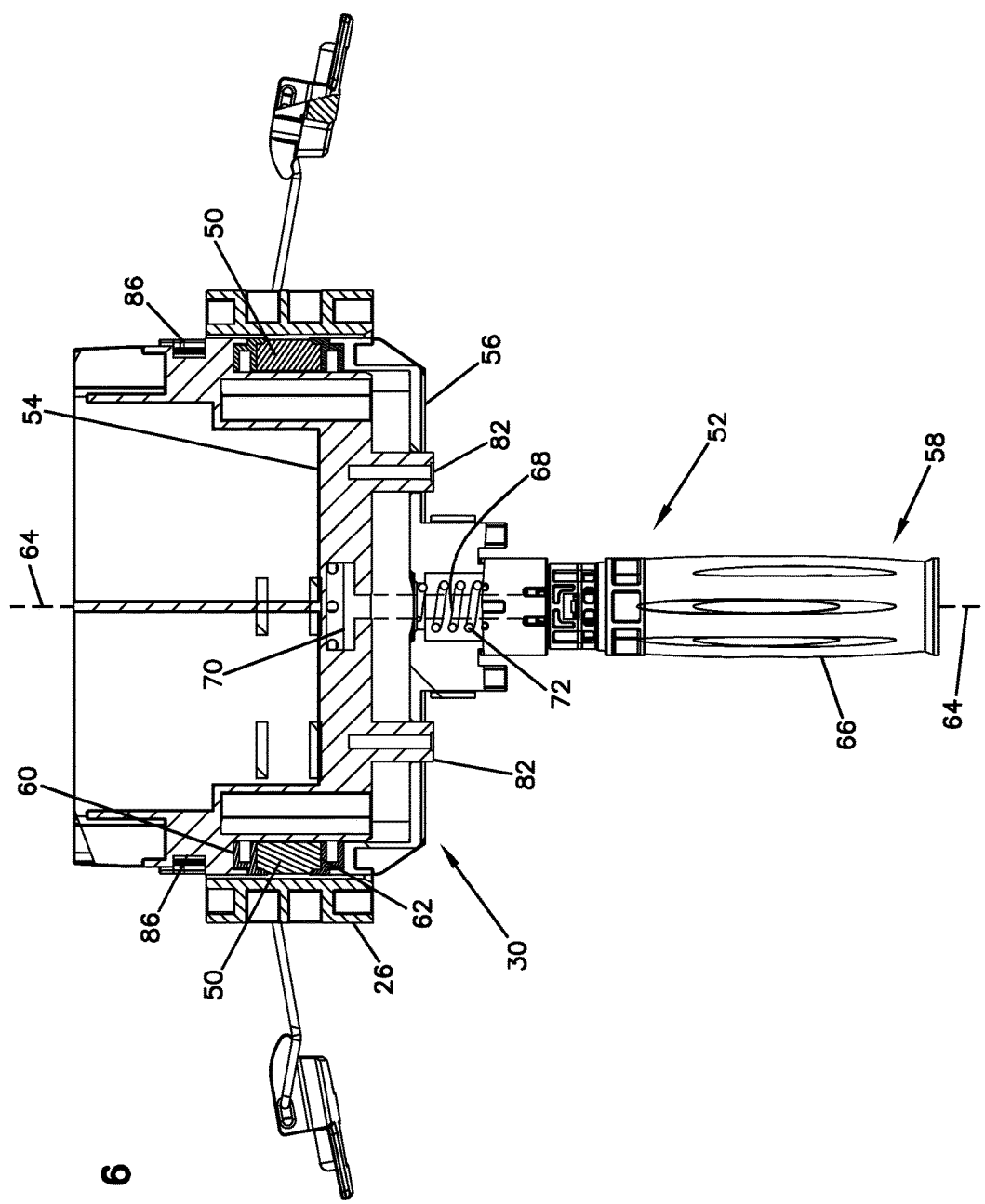
FIG. 6 is a cross-sectional view taken along section line 6-6 of FIG. 5.

Referring to FIG. 6, the actuator 58 includes a handle 66 that is threaded on a threaded shaft 68. An inner end 70 of the threaded shaft 68 is secured to the inner pressurization structure 54. The threaded shaft 68 is mounted so as to not rotate relative to the inner pressurization structure 54. The actuator 58 further includes a spring 72 positioned between the handle 66 and the outer pressurization structure 56. The spring 72 is positioned around the threaded shaft 68. By threading the handle 66 in a first direction about the threaded shaft 68, the handle 66 compresses the spring 72 against the outer side of the outer pressurization structure 56 thereby causing the inner and outer pressurization structures 54, 56 to be forced together such that the sealant material 50 between the inner and outer pressurization structures 54, 56 is pressurized. By threading the handle 66 in a second direction about the threaded shaft 68, the spring 72 is decompressed thereby depressurizing the sealant material 50. While the actuator 58 is depicted including a handle 66 on a threaded shaft 68, it will be appreciated that other actuation configurations such as cam levers or other structures can be used.

The insert assembly 28 further includes an exterior cable anchoring structure 74. The exterior cable anchoring structure 74 is configured for allowing cables to be anchored to the insert assembly 28 at a position outside of the housing 22. In the depicted embodiment, the exterior cable anchoring structure 74 includes two parallel cable anchoring plates 76 interconnected by a bridge plate 78. The threaded shaft 68 and the handle 66 extend between the cable anchoring plates 76. The cable anchoring plates 76 include a plurality of cable tie-down locations 80 including openings for routing cable ties used to fasten the jackets of the cables routed into the housing 22 to the exterior cable anchoring structure 74. The exterior cable anchoring structure 74 is positioned outwardly from the outer pressurization structure 56 and is fixed relative to the inner pressurization structure 54. For example, the bridge plate 78 can be attached to exterior fastening sections 82 that extend through the outer pressurization structure 56. The exterior fastening sections 82 are fastened to the bridge plate 78 of the exterior cable anchoring structure 74 to fix the exterior cable anchoring structure 74 relative to the inner pressurization structure 54. The exterior cable anchoring structure 74 prevents side loads from being transferred to the sealing material 50 of the sealing unit 30 and also transfers axial loads from the cables through the inner pressurization structure 54 to the base 26.

Figure 7:
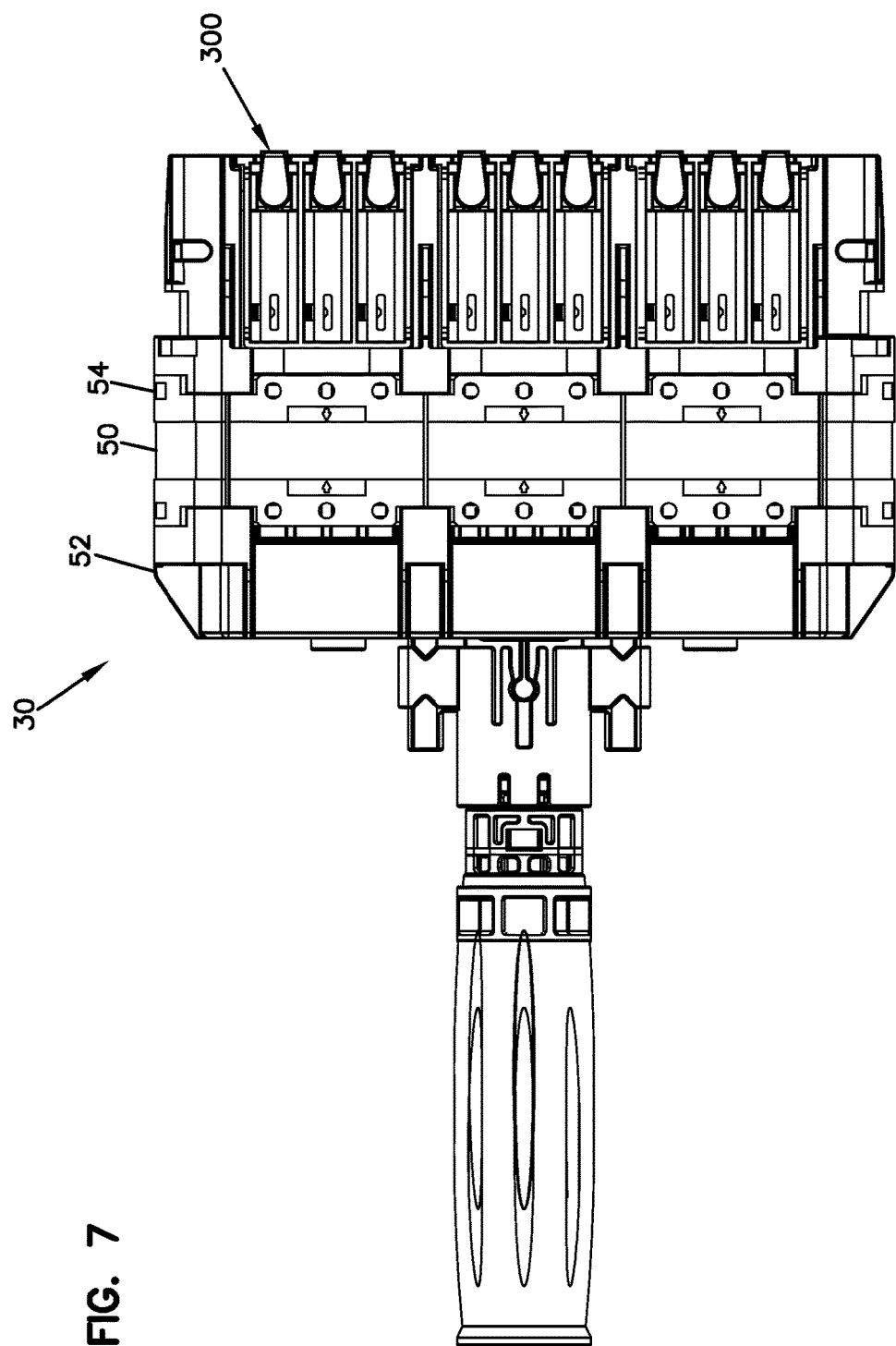
FIG. 7 is a top view of the sealing unit.

The insert assembly 28 can also include an interior cable anchoring structure 300 (see FIG. 7) positioned on or near the frame 34. The interior cable anchoring structure 300 can include fasteners, clamps, posts, or other structures for securing the strength members (e.g., Kevlar members, fiber reinforced polymeric rods, or other structures) of the cables routed through the cable ports 32 to the frame 34. The interior cable anchoring structure 300 transfers axial loads from the strength members of the cables through the inner pressurization structure 54 to the base 26. The frame 34 is preferably connected to the inner pressurization structure 54 so that movement is not permitted between the frame 34 and the inner pressurization structure 54. In this way, cables can be fixed relative to the inner pressurization structure 54 at locations both inside and outside the housing 22 of the telecommunications enclosure 20.

Figure 3:
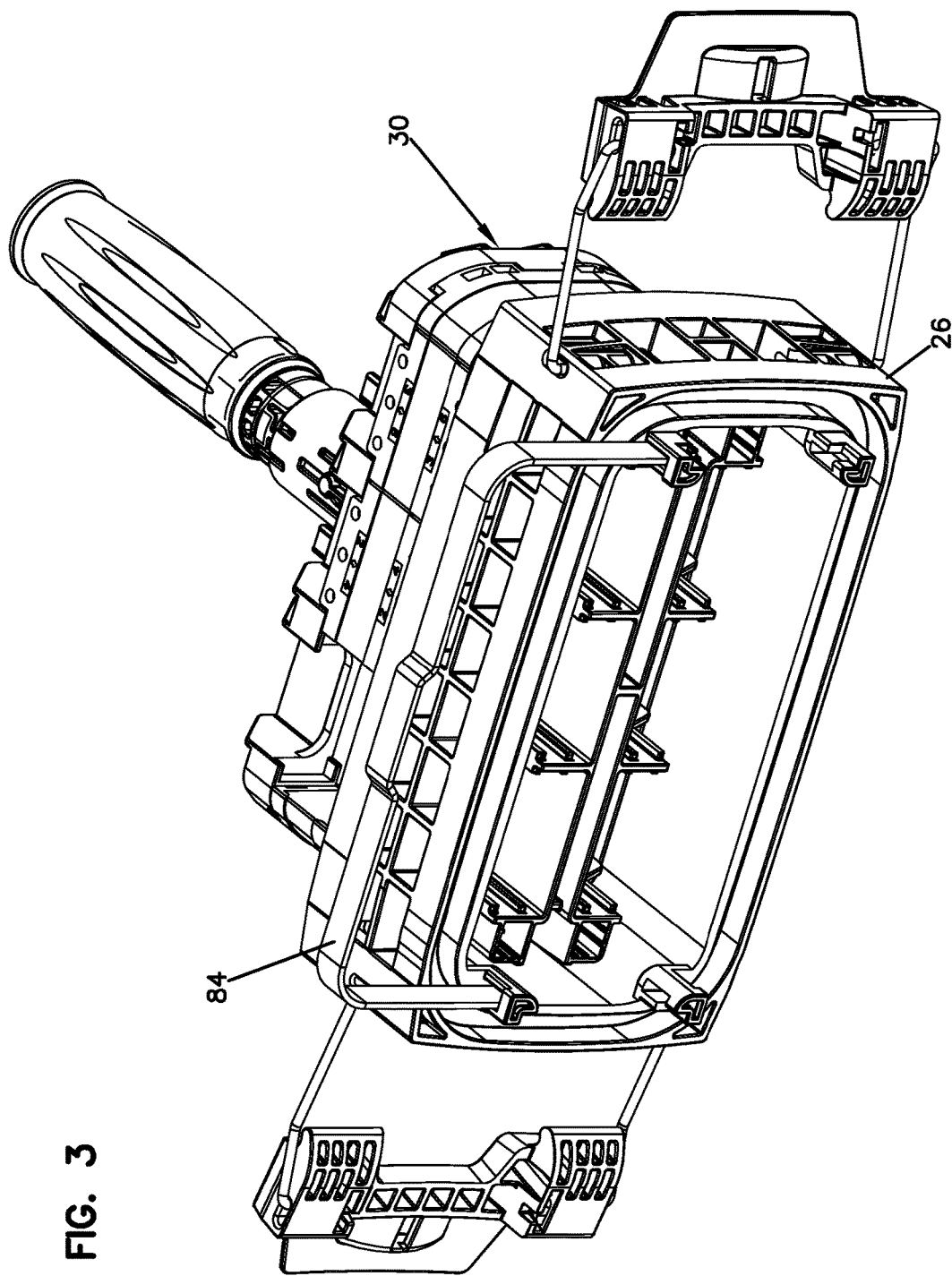
FIG. 3 is an inner perspective view of a base of the telecommunications enclosure of FIGS. 1 and 2 with a sealing unit partially inserted in the outer end of the base and a retainer for retaining an inner pressurization structure of the sealing unit shown in a non-retaining position.
Figure 4:
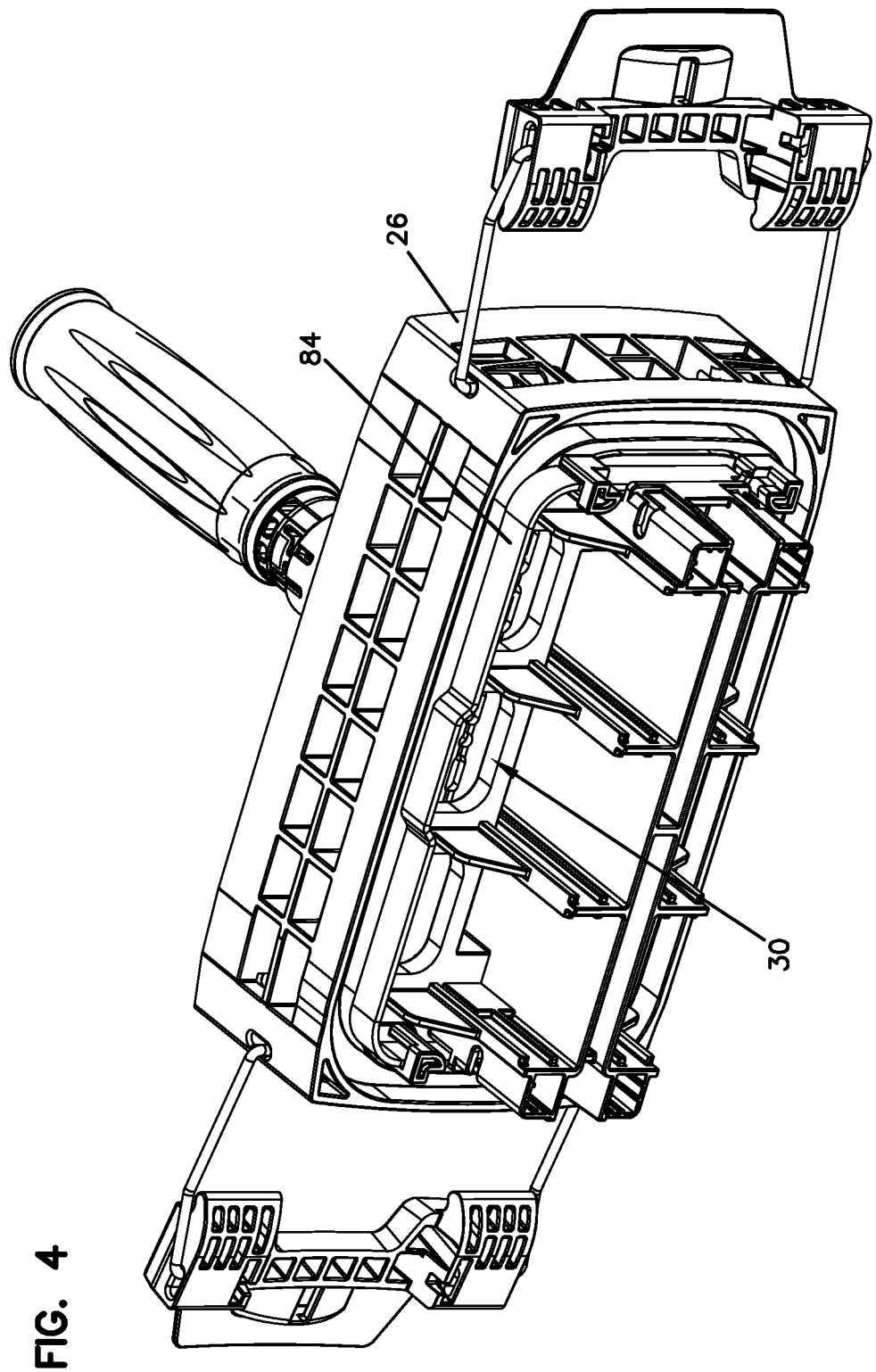
FIG. 4 is an inner perspective view of the components of FIG. 3 with the sealing unit fully inserted into the base and the retainer in a retaining position in which the retainer fixes the inner pressurization structure of the sealing unit relative to the base.

The insert assembly 28 is configured to be inserted into the housing 22 through the outer end 52 of the base 26. For example, the insert assembly 28 is inserted through the base 26 along the axis 64 that extends through the main opening 40 of the base 26. The insert assembly 28 is inserted through the base 26 until the sealing unit 30 is fully housed within the base 26. Once the sealing unit 30 is fully housed within the base 26, the inner pressurization structure 54 is anchored (e.g., fixed) relative to the base 26. For example, a retainer 84 can be used to fix the inner pressurization structure 54 relative to the base 26. The retainer 84 can be a U-shaped retainer that is slideably mounted to the base 26. In one example, the retainer 84 is not removable from the base 26. The retainer 84 is moveable relative to the base 26 between a non-retaining position (see FIG. 3) and a retaining position (see FIG. 4). In the non-retaining position, the retainer 84 is disengaged from the inner pressurization structure 54 such that the inner pressurization structure 54 can be moved relative to the base 26. Also, when the retainer 84 is in the non-retaining position of FIG. 3, the retainer 84 interferes with the ability to fit the dome 24 on the base 26. Therefore, the retainer 84 prevents a technician from mounting the dome 24 to the base 26 before the inner pressurization structure 54 has been fixed relative to the base 26. When the retainer 84 is slid relative to the base 26 to the retaining position of FIG. 4 while the sealing unit 30 is fully inserted within the base 26, the retainer 84 slides within slots 86 (see FIG. 6) defined by the inner pressurization structure 54 such that the inner pressurization structure 54 is prevented from moving along the axis 64 by the retainer 84.

To load the insert assembly 28 within the housing 22, the insert assembly 28 is initially inserted through the base 26 until the sealing unit 30 is housed within the base 26. Next, the retainer 84 is moved from the non-retaining position of FIG. 3 to the retaining position of FIG. 4 such that the inner pressurization structure 54 of the actuation arrangement 52 is fixed relative to the base 26. Thereafter, the handle 66 can be threaded in the first direction about the threaded shaft 68 to pressurize the sealant material 50 thereby forming seals about cables routed through the plurality of cable ports 32 and forming a peripheral seal around the interior of the base 26. The dome 24 can then be fitted to the base 26 and secured in place by the latches 48. As so configured, the frame 34 and the telecommunications components 36 are positioned within the dome 24. The telecommunications enclosure 20 can be re-entered without disturbing the sealing unit 30 by unlatching the latches 48 and removing the dome 24 from the base 26. A technician can then access the telecommunications components 36 on the frame 34 for servicing, maintenance, upgrades or other servicing needs.

Referring to FIG. 2, the mounting bracket 38 includes a main support structure 90 on which the base 26 of the housing 22 seats. The main support structure 90 includes a first end 92 and a second end 94. The mounting bracket 38 also includes a first mounting plate 96 pivotally connected to the first end 92 of the main support structure 90 by a first pivot pin 98 defining a vertical first pivot axis 100. The mounting bracket 38 further includes a second mounting plate 102 pivotally connected to the main support structure 90 by a second pivot pin 104 defining a second pivot axis 106. The first and second mounting plates 96, 102 are configured to be attached to a desired mounting location such as a wall, pole or other structure. For example, the first and second mounting plates 96, 102 are shown including mounting openings 108 for receiving fasteners (e.g., screws, bolts, nails, etc.) to secure the first and second mounting plates 96, 102 to their desired mounting locations.

The dual pivot arrangement described above with respect to the mounting bracket 38 allows the main support structure 90 to be selectively pivoted away from the mounting location to which the mounting bracket 38 is secured so as to provide enhanced access to the back side of the telecommunications enclosure 20 (e.g., telecommunications components 36 located at the back side of the insert assembly 28). By removing the first pivot pin 98 while the first and second mounting plates 96, 102 are attached to the desired mounting location, the main support structure 90 can pivot relative to the second mounting plate 102 about the second pivot axis 106. Similarly, by removing the second pivot pin 104 while the first and second mounting plates 96, 102 are attached to the mounting structure, the main support structure 90 can be pivoted relative to the first mounting plate 96 about the first pivot axis 100. As described above, the pivotal configuration of the mounting bracket 38 allows the main support structure 90 and the housing 22 supported thereon to be pivoted away from the structure to which the mounting bracket 38 is secured so as to provide enhanced access to both front and back regions of the telecommunications enclosure 20.

Referring again to FIG. 2, the main support structure 90, the mounting bracket 38 includes a back plate 110 and two spaced-apart support arms 112 that project forwardly from the back plate 110. When the housing 22 is supported on the mounting bracket 38, the outer end 42 (see FIG. 1) of the base 26 seats on the support arms 112 of the main support structure 90. The support arms 112 include a first securement interface 114 for attaching the mounting bracket 38 to the base 26 of the housing 22. In the depicted example, the first securement interface 114 includes first securement tabs 116 that project outwardly from the main bodies of the support arms 112. When the base 26 is seated on the support arms 112 as shown at FIG. 1, the first securement tabs 116 extend into the base 26 and can be secured to the base 26 by first fasteners 118 that extend through side walls of the base 26 and engage openings 120 in the first securement tabs 116. The first fasteners 118 can be pins, bolts, screws, rivets or other fasteners.

The mounting bracket 38 also includes a second securement interface 122 for attaching the mounting bracket 38 to the insert assembly 28. As shown at FIG. 2, the second securement interface 122 includes second securement tabs 124 that project downwardly from the main bodies of the support arms 112. When the base 26 is seated on the main support structure 90 and the insert assembly 28 is inserted within the housing 22, the second securement tabs 124 align with insert assembly anchoring tabs 126 connected to the exterior cable anchoring structure 74. The insert assembly 28 can be anchored relative to the mounting bracket 38 by using second fasteners 128 (e.g., bolts, screws, rivets, pins, etc.) to secure the second securement tabs 124 to the insert assembly anchoring tabs 126. In this way, the insert assembly 28 is fixed relative to the main support structure 90 of the mounting bracket 38.

In the field, a field technician can decide to use either the first securement interface 114 or the second securement interface 122 depending upon the particular field conditions. Using only the first securement interface 114 is advantageous because the insert assembly 28 can readily be removed from the base 26 without requiring the base 26 to be disconnected from the mounting location. With the insert assembly 28 removed from the base 26, the insert assembly 28 can be carried to location (e.g., a working table, a field truck, or other location) where the field technician can more easily perform necessary services on the insert assembly 28. To remove the insert assembly 28 from the base 26 while the telecommunications enclosure 20 is mounted to a mounting location with the mounting bracket 38, the housing 22 is initially removed from the base 26 by unlatching the latches 48. Next, the retainer 84 is moved to the non-retaining position such that the inner pressurization structure 54 of the sealing unit 30 is detached from the base 26. Thereafter, the actuator 58 can be used to depressurize the sealant material 50. Once the actuator 58 is de-actuated, the insert assembly 28 can be removed from the base 26 by pulling the insert assembly out of the base through the outer end 42 of the base 26.

Once servicing of the insert assembly 28 is complete, the technician returns the insert assembly 28 to the mounting location and loads the insert assembly 28 through the outer end 42 of the base 26. The retainer 84 is then moved from the non-retaining position to the retaining position such that the inner pressurization structure 54 is fixed relative to the base 26. Next, the actuator 58 is used to pressurize the sealant material 50 of the sealing unit 30 to provide adequate sealing of the plurality of cable ports 32 and the peripheral interface between the sealing unit 30 and the base 26. Finally, the dome 24 is reinstalled on the base 26.

Under certain circumstances, the insert assembly 28 cannot readily be moved away from the mounting location. For example, in certain circumstances, cables routed to the housing 22 may be secured to the mounting location (e.g., secured to a mounting pole on which the telecommunications enclosure 20 is mounted) thereby preventing the insert assembly 28 from being moved to a different servicing location. In this situation, the field technician may only use the second securement interface 122. By using only the second securement interface 122, the insert assembly 28 is effectively anchored to the mounting bracket 38, but the housing 22 and the dome 24 can be readily removed from the insert assembly 28 while the insert assembly remains supported by the mounting bracket 38. In this way, the field technician can access all parts of the insert assembly 28 while the insert assembly is securely held in place by the mounting bracket 38. With the dome 24 and base 26 removed from the insert assembly 28 while the insert assembly is supported by the mounting bracket 38, access to the back side of the insert assembly 28 is facilitated by using the pivoting feature of the mounting bracket 38 to pivot the main support structure 90 and the insert assembly 28 attached thereto outwardly away from the mounting location.

To remove the housing 22 from the insert assembly 28 while the insert assembly is anchored to the mounting bracket 38, the dome 24 is initially removed from the base 26 by unfastening the latches 48. Next, the retainer 84 is moved to the non-retaining position such that the inner pressurization structure 54 of the sealing unit 30 is disconnected from the base 26. Thereafter, the actuator 58 is used to depressurize the sealant material 50. Once the actuator 58 has been de-actuated, the base 26 can be slid upwardly over the insert assembly 28 to reveal the sealing unit 30. Once the servicing is complete, the base 26 can be slid over the insert assembly 28 until the base seats on the main support structure 90. Next, the retainer 84 is moved to the retaining position in which the retainer 84 fixes the inner pressurization structure 54 relative to the base 26. The sealant material 50 of the sealing unit 30 is then pressurized using the actuator 58. Finally, the dome 24 is reinstalled on the base 26.

From the forgoing detailed description, it will be evident that modifications and variations can be made without departing from the spirit and scope of the disclosure.

LIST OF REFERENCE NUMERALS AND CORRESPONDING FEATURES 20 telecommunications enclosure
22 housing
24 dome
26 base
28 insert assembly
30 sealing unit
32 plurality of cable ports
34 frame
36 telecommunications components
38 mounting bracket
40 main opening
42 outer end
44 inner end
46 open end
48 latches
50 sealant material
52 actuation arrangement
54 inner pressurization structure
56 outer pressurization structure
58 actuator
60 inner side
62 outer side
64 axis
66 handle
68 threaded shaft
70 inner end
72 spring
74 exterior cable anchoring structure
76 cable anchoring plates
78 bridge plate
80 cable tie-down locations
82 exterior fastening sections
84 retainer
86 slots
90 main support structure
92 first end
94 second end
96 first mounting plate
98 first pivot pin
100 first pivot axis
102 second mounting plate
104 second pivot pin
106 second pivot axis
108 mounting openings
110 back plate
112 support arms
114 first securement interface
116 first securement tabs
118 first fasteners
120 openings
122 second securement interface
124 second securement tabs
126 insert assembly anchoring tabs
128 second fasteners
300 interior cable anchoring structure

What is claimed is:

1. A telecommunications enclosure comprising:
a housing including a dome that connects to a base;
an insert assembly that fits within the housing, the insert assembly including a sealing unit that fits within the base and that defines a plurality of cable ports, the insert assembly also including a frame attached to the sealing unit and a telecommunications component mounted to the frame, wherein the frame is housed within the dome when the sealing unit is fitted within the base;
a mounting bracket for mounting the housing at a desired mounting location;
the mounting bracket having a first securement interface for attaching the mounting bracket to the base of the housing, wherein when the mounting bracket is attached to the base by the first securement interface the insert assembly can be removed from the housing without detaching the base from the mounting bracket; and
the mounting bracket having a second securement interface for attaching the mounting bracket to the insert assembly, wherein when the mounting bracket is attached to the insert assembly by the second securement interface the base and the dome can be removed from the insert assembly without detaching the insert assembly from the mounting bracket.

2. The telecommunications enclosure of claim 1, wherein the sealing unit includes a sealant material and an actuation arrangement for pressurizing the sealant material, the actuation arrangement include inner and outer pressurization structures between which the sealant material is positioned, the actuation arrangement also including an actuator for forcing the inner and outer pressurization structures together to pressurize the sealant material, wherein when the sealing unit is fitted within the base of the housing the inner pressurization structure opposes an inner side of the sealant material and the outer pressurization structure opposes an outer side of the sealant material, wherein the inner side of the sealant material faces toward the dome and the outer side of the sealant material faces away from the dome, and wherein the cable ports extend through the sealant material between the inner and outer pressurization structures such that cables can be directed through the base and into the dome by routing the cables through the cable ports.

3. The telecommunications enclosure of claim 2, wherein the frame is connected to the inner pressurization structure and the inner pressurization structure is secured to the base of the housing by a retainer.

4. The telecommunication enclosure of claim 3, wherein the retainer is a U-shaped retainer that is slidably mounted relative to the base of the housing.

5. The telecommunications enclosure of claim 4, wherein the U-shaped retainer is movable relative to the base between a retaining position where the U-shaped retainer engages the inner pressurization structure to fix the inner pressurization structure relative to the base and a non-retaining positioned where the U-shaped retainer is disengaged from the inner pressurization structure such that the inner pressurization structure can be moved relative to the base.

6. The telecommunications enclosure of claim 5, wherein the U-shape retainer is designed to be non-removable from the base, and wherein the U-shaped retainer prevents the dome from being mounted on the base when the U-shaped retainer is in the non-retaining position.

7. The telecommunications enclosure of claim 3, wherein the insert retainer assembly includes an exterior cable anchoring structure positioned outwardly with respect to the outer pressurization structure, the exterior cable anchoring structure being fixed relative to the inner pressurization structure.

8. The telecommunications enclosure of claim 7, wherein the inner pressurization structure includes an exterior fastening section that extends though the outer pressurization structure, and wherein the exterior cable anchoring structure is secured to the exterior fastening section.

9. The telecommunications enclosure of claim 7, wherein the insert assembly includes an interior cable anchoring structure fixed relative to the second pressurization structure and positioned inwardly with respect to the inner pressurizations structure.

10. The telecommunications structure of claim 7, wherein the exterior cable anchoring structure defines a plurality of cable tie-down locations.

11. The telecommunications structure of claim 10, wherein the exterior anchoring structure includes a cable anchoring plate.

12. The telecommunications structure of claim 11, wherein the exterior anchoring structure includes two parallel cable anchoring plates, and wherein a handle of the actuator extends between the two cable anchoring plates.

13. The telecommunication enclosure of claim 7, wherein the mounting bracket includes a main support structure including a back plate and two spaced-apart support arms that project forwardly from the back plate, wherein the base of the housing seats on the support arms, wherein the first securement interface includes first securement tabs that project upwardly from the support arms into the base and are secured to the base by first fasteners, and wherein the second securement interface includes second securement tabs that project downwardly from the support arms and are secured to the first cable anchoring structure by second fasteners.

14. The telecommunications enclosure of claim 1, wherein the mounting bracket includes a main support structure on which the base of the housing seats, the main support structure including a first end and a second end, the mounting bracket also including a first mounting plate pivotally connected to the first end of the main support structure by a first pivot pin defining a first pivot axis, the mounting bracket further including a second mounting plate pivotally connected to the second end of the main support structure by a second pivot pin defining a second pivot axis, wherein the main support structure can pivot relative to the first mounting plate about the first pivot axis by removing the second pivot pin, and wherein the main support structure can pivot relative to the second mounting plate about the second pivot axis by removing the first pivot pin.

15. A telecommunications enclosure comprising:
a housing including a dome that connects to a base;
a mounting bracket for mounting the housing at a desired mounting location, the mounting bracket having a main support structure on which the base of the housing seats, the main support structure including a first end and a second end, the mounting bracket also includes a first mounting plate pivotally connected to the first end of the main support structure by a first pivot pin defining a first pivot axis, the mounting bracket further including a second mounting plate pivotally connected to the second end (94) of the main support structure by a second pivot pin defining a second pivot axis;
wherein the main support structure can pivot relative to the second mounting plate about the second pivot axis by removing the first pivot pin, and wherein the main support structure can pivot relative to the first mounting plate about the first pivot axis by removing the second pivot pin.

16. A telecommunications enclosure comprising:
a housing including a dome that connects to a base;
the enclosure including a sealing unit that fits within the base and that defines a plurality of cable ports, the sealing unit includes a sealant material and an actuation arrangement for pressurizing the sealant material, the actuation arrangement include inner and outer pressurization structures between which the sealant material is positioned, the actuation arrangement also including an actuator for forcing the inner and outer pressurization structures together to pressurize the sealant material, wherein the sealing unit is fitted within the base of the housing, the inner pressurization structure opposes an inner side of the sealant material and the outer pressurization structure opposes an outer side of the sealant material, wherein the inner side of the sealant material faces toward the dome and the outer side of the sealant material faces away from the dome, the enclosure further includes a retainer, the retainer is movable relative to the base between a retaining position where the retainer engages the inner pressurization structure to fix the inner pressurization structure relative to the base and a non-retaining positioned where the retainer is disengaged from the inner pressurization structure such that the inner pressurization structure can be moved relative to the base, wherein the retainer prevents the dome from being mounted on the base when the retainer is in the non-retaining position, and wherein the retainer is designed to be non-removable from the base.

17. A telecommunications enclosure comprising:
a housing including a dome that connects to a base;
the enclosure including a sealing unit that fits within the base and that defines a plurality of cable ports, the sealing unit includes a sealant material and an actuation arrangement for pressurizing the sealant material, the actuation arrangement include inner and outer pressurization structures between which the sealant material is positioned, the actuation arrangement also including an actuator for forcing the inner and outer pressurization structures together to pressurize the sealant material, wherein the sealing unit is fitted within the base of the housing, the inner pressurization structure opposes an inner side of the sealant material and the outer pressurization structure opposes an outer side of the sealant material, wherein the inner side of the sealant material faces toward the dome and the outer side of the sealant material faces away from the dome, the enclosure further includes an exterior cable anchoring structure positioned outwardly with respect to the outer pressurization structure, the exterior cable anchoring structure being fixed relative to the inner pressurization structure.

* * * * *